United States Patent [19]
Hogt et al.

[11] Patent Number: 6,103,833
[45] Date of Patent: Aug. 15, 2000

[54] PROCESS FOR ENHANCING THE MELT STRENGTH OF POLYPROPYLENE (CO)POLYMERS

[75] Inventors: Andreas Herman Hogt, Enschede; Boen Ho O, Utrecht; Hans Westmijze, Bathmen, all of Netherlands

[73] Assignee: Akzo Nobel N.V., Arnhem, Netherlands

[21] Appl. No.: 09/211,807

[22] Filed: Dec. 15, 1998

Related U.S. Application Data

[63] Continuation of application No. PCT/EP97/03097, Jun. 12, 1997.
[51] Int. Cl.[7] ................................................. C08F 8/50
[52] U.S. Cl. ........................ 525/386; 525/333.8; 525/387
[58] Field of Search ...................................... 525/386, 387

[56] References Cited

U.S. PATENT DOCUMENTS

| | | | |
|---|---|---|---|
| 4,897,452 | 1/1990 | Berrier et al. | 525/333.8 |
| 5,047,485 | 9/1991 | DeNicola, Jr. | 525/387 |
| 5,140,074 | 8/1992 | DeNicola, Jr. et al. | 525/263 |
| 5,260,390 | 11/1993 | Torenbeek et al. | 526/200 |
| 5,416,169 | 5/1995 | Saito et al. | 525/387 |

FOREIGN PATENT DOCUMENTS 1495285  12/1968  Germany.

*Primary Examiner*—Bernard Lipman
*Attorney, Agent, or Firm*—Richard P. Fennelly

[57] ABSTRACT

The invention pertains to a process for enhancing the melt strength of a polypropylene (co)polymer with the aid of initiator dispersions. The use of initiator dispersions with a particulate initiator instead of the corresponding non-dispersed initiators or their dilutions or solutions results in a significant enhancement of the melt strength of the modified polymer, and a wide range of initiators turn out to be serviceable.

20 Claims, No Drawings

PROCESS FOR ENHANCING THE MELT STRENGTH OF POLYPROPYLENE (CO)POLYMERS

This is a continuation of PCT International Application no. PCT/EP97/03097, filed Jun. 12,1997, which claims priority from Netherlands Application No. 1003406, filed Jun. 24, 1996.

BACKGROUND OF THE INVENTION

This invention pertains to a process for enhancing the melt strength of a polypropylene (co)polymer by mixing an initiator with the polypropylene (co)polymer at a temperature below the decomposition temperature and heating the mixture, with most of the initiator decomposing before the polymer has melted and with the formed radicals reacting with the polymer.

Such a process is known from DE-A-4,340,194, where a polypropylene homopolymer or copolymer is mixed with bis(2-ethylhexyl) peroxydicarbonate, after which, as a result of the initiator decomposing and an after treatment with heat in an inert atmosphere, a modified polymer with enhanced melt strength is obtained. For greater ease of handling and effective distribution through the polymer, the initiator employed is diluted with an inert solvent. However, there are several drawbacks to the process disclosed in the German patent application. In particular, the handling of the bis(2-ethylhexyl) peroxydicarbonate that is utilized is attended with certain risks, among them premature (explosive) decomposition. It is true that this risk is reduced by mixing the initiator with an inert solvent, but this means that a substantial quantity of an undesired additive is introduced into the end product. Besides, the required storage temperature and the temperature at which it is still possible to handle the dissolved initiator continue to be low. The patent publication also shows that only one specific initiator, the aforesaid bis(2-ethylhexyl) peroxydicarbonate, is suitable for increasing the melt strength of the polymer.

SUMMARY OF THE INVENTION

Surprisingly, it has now been found that the effectiveness of the process can be improved significantly, and the range of suitable initiators increased substantially, by making use of specific formulations of initiators. To this end the invention is characterised in that the polypropylene (co)polymer is contacted with a dispersion of the initiator in a polar medium, with at least 90% by weight of the initiator particles being smaller than 50 lm and at least 99% by weight of the initiator particles being smaller than 65 gm.

DESCRIPTION OF THE PREFERRED EMBODIMENTS

It is recommended to select the smallest possible size for the initiator droplets or particles in the dispersion. Preferably, at least 99% by weight (% w/w) of the initiator particles are smaller than 50 $\mu$m. More preferably, at least 90% w/w of the initiator particles are smaller than 20 $\mu$m.

It should be noted that EP-A-384,431, like DE-A-4,340, 194, describes a process for modifying a polypropylene (co)polymer with the aid of a reactive initiator. The resulting polymer is characterised by a branching index of less than 1 and having significant strain hardening elongational viscosity. Also mentioned is the use of initiators both in the neat form and in solutions in an inert liquid medium, such as a hydrocarbon. According to this patent publication, suitable initiators in this process are those having a reactivity within certain limits. As suitable compounds are mentioned, in particular, peroxydicarbonates and peresters of neodecanoic acid and 2,2-dimethyl propanoic acid.

EP-A-287,239 describes a process for the manufacture of non-sticky pellets of slightly degraded polypropylene. To this end the polypropylene (co)polymer is contacted with two initiators, including a reactive initiator. The initiators used in that case may be liquid or solid, dissolved in water or a hydrocarbon, or else associated with an inert solid carrier. The reactivity of the second initiator in that case will be low enough for it not to decompose until it is in the polymeric melt, usually at temperatures in the range of about 160 to 240° C.

Non-prepublished European Patent Application EP-A-0 735,054 discloses how a modified polyolefin can be treated with water to reduce the amount of impurities, typically being unreacted monomer, or oligomer of this monomer that is formed during the modification step of the polyolefin with said monomer. During the modification a peroxide is typically used. However, the use of a peroxide dispersion in a polar medium has not been disclosed.

The term "polypropylene (co)polymer" refers to polymers or mixtures of polymers containing at least 50% by weight of polymerized propylene. Use may be made in this connection of block copolymers, tercopolymers, alternating copolymers, and random copolymers. Generally, a polypropylene copolymer in the polymerized form will contain one or more other olefins, such as ethylene, butene, pentene, hexene, heptene, or octene, but it may also comprise other olefinically unsaturated monomers or combinations of these, such as the acrylates, styrene and styrene derivatives, acrylonitrile, vinyl acetate, vinylidene chloride, and vinyl chloride. It is preferred here to restrict the content of olefins other than propylene to 30% by weight of the copolymer. Especially suited are copolymers of propylene and ethylene or mixtures of polypropylene and polyethylene containing not more than 10% by weight of polymerized ethylene. The molecular weight of the (co)polymer of which use is made can be selected within wide-ranging limits. Indicative of the molecular weight is the melt-flow index (MFI). Use may be made of (co)polymers having an MFI from 0.1 to 100 g/10 min (2.16 kg, 230° C.). Preferably, use is made of (co) polymers having an MFI from 0.5 to 50 g/10 min (2.16 kg, 230° C.).

The term "initiators" comprises all compounds capable of generating free radicals. Examples of such compounds are peroxides, azo initiators, C—C initiators, and N—O initiators. Optionally, a combination of initiators from one or more of these categories may be employed. During the modification of the polypropylene (co)polymer, preferably more than 95% the initiator(s) decomposes at temperatures below the melting point of the polypropylene (co)polymer. If so desired, a combination of initiator and accelerator may be used to attain the required reactivity. However, it is preferred to use initiators having a half life of one hour at temperatures below 100° C. The quantity of initiator, in the dispersed form, which is actually used according to the invention will be dependent on the desired degree of modification and on the polypropylene (co)polymer employed. Preferably, use is made of initiator concentrations in the range of 0.05 to 5 mmole/100 g (co)polymer. Depending on the nature of the initiator, the dispersion according to the invention may also comprise one or more conventional phlegmatisers which are frequently pre-mixed with the initiator to make it safe to handle. When such a pre-mix is used to make the initiator dispersion, the initiator particles or droplets will also contain this phlegmatiser. Preferably, the initiator used is a peroxydicarbonate. For instance, advantageous use can be made of bis(2-ethylhexyl) peroxydicarbonate, a peroxide which is liquid at room temperature. Depending on the conditions, however, it may be that solid peroxydicarbonates are preferred at room temperature, since they permit higher storage and processing temperatures.

The term "melt strength" as used throughout this document is in accordance with the definition as given by J. M. Dealy et al. in Melt Rheology and its Role in Plastics Processing, (New York, van Nostrand Reinhold 1990), pp. 247.

By mixing the initiator dispersion with the (co)polymer below the decomposition temperature is meant that the (co)polymer is physically mixed with the initiator dispersion in a manner known to the skilled person, for example, in mixers with low or high shearing forces, with the temperature of the initiator at least being selected below that at which the half life of the initiator is 0.1 hour. Preferably, the temperature of the (co)polymer will also meet this criterion. At the temperatures employed the initiator preferably has a half life of one hour or more. Preferably, both the (co)polymer and the initiator dispersion are kept at a temperature which is lower than that at which the half life of the initiator is ten hours. Only after stringent safety measures have been taken can the initiator having a temperature as defined above be added to a (co)polymer with a temperature higher than that at which the half life of the initiator is 0.1 hour.

Generally, the initiator dispersion is mixed with the (co)polymer below the decomposition temperature, during and/or after which the temperature is raised, in order to allow the peroxide to decompose and react with the (co)polymer before the (co)polymer has melted.

The medium in which the initiator according to the invention is dispersed should be inert towards the initiator and polar enough so that the initiator will hardly dissolve in it and the polypropylene (co)polymer will be incompatible with it. The initiator preferably is dispersed in water or an alcohol. Most preferable is a dispersion in water. The use of such a medium makes for comparatively easy removal of any remnant after the modification of the (co)polymer if so desired. Furthermore, the use of water or alcohols is attended with far fewer organoleptic and other drawbacks than the use of organic diluents, such as toluene and xylene, which have been common solvents up to now. Depending on the solubility of the initiator, some initiator will dissolve in the polar medium, but this hardly influences the efficiency of the process according to the invention. Preferably less than 20% by weight of the initiator is dissolved in the polar medium. More preferably, less than 10% by weight of the initiator is dissolved. For greater ease of handling of the initiator dispersion it may be advisable to obtain the initiator dispersion in a solid form. To this end the dispersion can be incorporated into an appropriate carrier material, preferably an inert porous carrier material. Examples of suitable carrier materials are silica, the silicates, alumina, and other inorganic oxides, zeolites and other inorganic minerals, clays, whiting, phosphates, sulfates, cellulose products, diatomaceous earth, and porous polymers.

As is well-known to the skilled person, the use of other adjuvants in initiator dispersions may be advisable or even essential in order to ensure the dispersion's chemical and/or physical stability for a sufficiently long period of time. For instance, if the storage temperature of the initiator dispersion is lower than the freezing point of the medium in which the initiator is dispersed, an appropriate freezing point depression agent can be added to counteract freezing. Also, a wide range of substances can be used for altering the rheology of the formulation. To this end use is generally made of one or more surface-active materials and one or more thickeners. If so desired, other additives may be incorporated into the formulation. As examples of such additives may be mentioned pH buffers, biocides, chemical stabilizers which counteract premature decomposition of the initiator, and physical stabilizers, such as thickeners, which counteract the particle size growth in the dispersion.

If a freezing point depression agent is employed, preference is given to the use of one or more aliphatic alkanols having 1 to 4 carbon atoms or an aliphatic glycol having 2 to 4 carbon atoms. Alternatively, however, salts, glycerols and/or higher alkanols or combinations of freezing point depression agents may be used if so desired. The following alcohols can be used to advantage: methanol, ethanol, propanol, ethylene glycols, and propane-1,2-diol.

The surface active material may be either polymeric or non-polymeric in origin. In addition, the surface-active material may be amphoteric, anionic, cationic or non-ionic. Also, a wide range of thickeners, including protective colloids and associative thickeners, either polymeric or non polymeric by nature and either organic or inorganic in origin, may be used in the formulation in order to obtain a product having acceptable rheology and stability.

The quantity of surface active material and thickener used in the initiator dispersion is dependent on the materials employed. Preferably, the content of surface active material in the formulation is more than 1% by weight (% w/w) of the weight of the initiator in the formulation. Preferably, more than 2.5% w/w of surface active material is present, calculated on the weight of the initiator. The desired quantity of thickener and/or freezing point depression agent to be used is dependent on the desired stability and on the nature and concentration of other substances in the formulation. Preferably, less than 20% w/w of the freezing point depression agent will be present in the total formulation.

Virtually all surface active materials which are allowable in the products which can be made using the modified polypropylene (co)polymer according to the invention can be utilized in the initiator dispersions. Although this means that certain cationic surface active materials can be used, preference is given to anionic and non-ionic surface active materials. Among the preferred anionic and non-ionic surface active materials, which may be polymeric or not, are (i) the alkoxylated, sulphonated, sulphated and/or phosphonated products of alcohols, including fatty alcohols, oil derivatives, fatty acids and their derivatives, and alkyl phenols, (ii) fatty acid esters of sugars, (iii) cellulose derivatives, (iv) partially saponified polyvinyl acetates, (v) polyacrylates, (vi) appropriate (block) copolymers, and (vii) mixtures of these substances.

As suitable thickeners may be mentioned water-soluble polymers, such as gelatine, polyacrylates (cross-linked or not), polycarbohydrates such as the well-known gums (e.g. xanthan gum and guar gum), as well as derivatives of such polycarbohydrates and cellulose derivatives and mixtures of these substances. Optionally, these thickeners may be mixed with mineral or fibrous additives and associative thickeners. Associative thickeners generally are polymers of the A-B-C structure, with A and C representing water-insoluble groups such as alkyl or polyalkoxy (having more than two carbon atoms per alkoxy unit) groups and with B representing polymeric water-soluble groups such as polyglycol ethers or polyglycerol ethers.

In the process according to the invention the polypropylene (co)polymer usually is modified at a temperature in the range of about 50 to 150° C. Optionally, in order to apply the process according to the invention, use may be made of equipment with a processing temperature above the melting temperature of the (co)polymer, e.g., an extruder. Because of its thermal instability, the initiator will decompose for the most part during the heating-up phase and react with the as yet unmolten polymer. If an initiator suspension is used, it is preferred in this case to carry out the modification at a temperature above the melting temperature of the initiator.

The polypropylene (co)polymer can be modified in a range of different equipment. A sealable reactor in which a solid can be kept in motion in an inert atmosphere, at an adjustable temperature, will usually suffice for this purpose. Preferably, the decomposition of the initiator is carried out under oxygen-free conditions. The reactor used may be, say, a powdered bed reactor or a solids mixer with low or high shearing forces. Alternatively, the modification of the (co) polymer may be carried out in a slurry or suspension of the (co)polymer in water or in an inert medium, such as a hydrocarbon, with the initiator preferably having a greater affinity for the (co)polymer than for the medium, or with the initiator being forcibly contacted with the (co)polymer by evaporation of the medium. The modification of the polypropylene (co)polymer according to this process can take place in any of the reactors that are or were used in the (co) polymerization process of the polyolefin, if so desired. However, the modification of the (co)polymer is preferably carried out using an extruder.

The polypropylene (co)polymer obtained using the process according to the invention may be processed into an end product without any further adaptations if so desired. It was found that in that case the modified (co)polymer obtained by the process according to the invention has a substantially better melt strength than the (co)polymer types of increased melt strength known so far, which were obtained, say, by making use of non-dispersed initiators or irradiation sources. Optionally, the modified polypropylene (co)polymer may be purified, modified or molded, in one or more process steps, prior to its final processing. Thus there may be further modification using another polymer or monomer in order to enhance the end product's compatibility with other materials. Alternatively, the modified polypropylene (co)polymer may be degraded or, on the contrary, cross-linked slightly, optionally again with the aid of initiators, to increase its processability and/or applicability.

Generally, to achieve the desired end product conventional adjuvants such as antioxidants, UV-stabilizers, lubricants, antiozonants, foaming agents, nucleating agents, fillers and/or antistatic agents are added to the (co)polymer. These adjuvants can be added to the (co)polymer before as well as during or after the modifying step according to the invention. The modified (co)polymer can be processed into the desired end product in all kinds of ways known to the skilled person, with the processing conditions generally being dependent on the material and equipment employed. Preferably, a stabilizer, e.g., one or more antioxidants, is added to the obtained modified polypropylene, in order to render harmless any free radicals still present as well as any radicals which may be formed later from as yet unreacted initiator.

The modified polypropylene (co)polymer obtained by this invention is preeminently suited to be used in the manufacture of foamed products, such as described, int. al., in British Plastics & Rubber, January 1996, pp. 4–5. When the foam to be manufactured is used for packaging purposes, generally use is made of a non-cross-linked polypropylene (co) polymer. However, cross-linked polypropylene (co)polymer may be employed as well, for example, in applications where dimensional stability, optionally at high temperatures, is of the essence. Especially when polyolefin foams are used in automobiles, for example, as sound insulating and/or coating material, cross-linked polymers are frequently employed. Also, in these types of applications it is often advisable to increase the melt strength of the polymer. The process according to the invention can be of use here. In that case the modification of the polypropylene (co)polymer is preferably carried out in the apparatus which is also used for shaping the foamed products.

Another major application for the modified polypropylene (co)polymer obtained by this invention is thermoforming, especially thermoforming of large parts such as spas, refrigerator door liners, and cooler liners. In this application the resins according to the invention can replace the resins that are conventionally used, such as acrylonitrile-butadiene-styrene copolymer (ABS) and high-impact polystyrene (HIPS).

In addition to the aforementioned advantages, the use of water as dispersion medium is advantageous in that very safe initiator formulations are obtained, incorporated into a carrier material or not, making the initiator easier to handle and use. Furthermore, the use of water as dispersion medium for the initiator may have the additional advantage that any phosphite employed to passify residual catalyst (from the (co)polymerization process) will be hydrolysed during the modification, which has a beneficial effect on color stability, as is described in G. Scott, ed., Developments in Polymer Stabilisation-2, (London: Applied Science Publishers Ltd., 1986), pp. 168–169.

The invention will be further illustrated with reference to the following Examples.

Experimental section

Materials

| Polypropylene (co)polymer: | |
|---|---|
| Moplen ® FLS20 | homo-polypropylene from Himont. |
| Fortilene ® 9500 K21 | polypropylene copolymer from Solvay. |
| HC00A1-B1 | homo-polypropylene from Borealis. |
| Profax ® PF814 | high melt strength polypropylene from Himont. |
| Initiators, all from Akzo Nobel: | |
| Liladox ® | dicetyl peroxydicarbonate. |
| Liladox 33W | suspension of Liladox in water (33% w/w). |
| Perkadox ® 16 | bis(4-tert-butylcyclohexyl) peroxydicarbonate. |
| Perkadox 16-W40 | suspension of 40 wt % Perkadox 16 in water. |
| Perkadox 26 | dimyristyl peroxydicarbonate. |
| Laurox ® | dilauroyl peroxide. |
| Laurox-W40-GD4 | suspension of 40% w/w Laurox in water. |
| Lucidol ®-W75 | dibenzoyl peroxide containing water (solid). |
| Lucidol-W40 | suspension of 40 wt % dibenzoyl peroxide in water. |
| Trigonox ®99 | α-cumyl peroxyneodecanoate. |
| Trigonox 151 | 2,4,4-trimethylpentyl-2-peroxyneodecanoate. |
| Trigonox 23 | tert-butyl peroxyneodecanoate. |
| Trigonox 23-W50 | emulsion of 50% w/w Trigonox 23 in water. |
| Trigonox 25-C75 | 75% w/w tert-butyl peroxypivalate in isododecane. |
| Trigonox 25-W33 | 44% w/w Trigonox 25-C75 in water |
| Surface-active materials: | |
| Sucroester ® SE15 | non-ionic fatty acid ester of sucrose from Gattefosse |

Experimental section (continued)

| Materials | |
|---|---|
| Lubrol ® N13 | non-ionic ethoxylated nonyl phenol from ICI |
| Serdet ® DMK 50 | anionic sodium lauryl benzene sulfonate from Servo Delden |
| Gohsenol ® KP08 | non-ionic partially hydrolyzed polyvinyl acetate (PVA) from Nippon Gohsei |
| Unitika ® UMR 10 m | PVA from Unitika |
| Methocel ® F50 | non-ionic cellulose ether derivative from Dow Chemical |
| Dapral ® GE202 | copolymer from Akzo Nobel. |
| Dispex ® N40 | anionic sodium polyacrylate from Allied Colloids |
| Arquad ® 2.10–50 | cationic didecyl dimethyl ammonium chloride from Akzo Nobel |
| Amphoteric 16 ® | amphoteric cetyl dimethyl betaine from Akzo Nobel |
| Other materials: | |
| Irganox ® 1010 | antioxidant from Ciba Geigy. |
| Perkalink ® 300 | triallyl cyanurate from Akzo Nobel. |
| Silica | Ketjensil ® SM500 from Akzo-PQ Silica |
| Water | demineralized. |
| All other chemicals were of standard laboratory quality. | |

Process

Initiator dispersions were prepared by adding the initiator to a polar medium which, optionally, included additives in a concentration of 1.3% w/w. Next, the initiator was dispersed with an UltraTurrax® type S25N-25GM for thirty seconds and with an UltraTurrax type S25N-25F for two minutes, both at full power, with the temperature of the solution/dispersion being kept below the decomposition temperature of the initiator. The initiator suspensions were then subjected to an ultrasonic treatment in a Retch ultrasonic bath type UR-275 for two and one-half hours and, optionally, sieved in a 100 µm sieve.

Unless stated otherwise, the modification of the polypropylene (co)polymer took place at atmospheric pressure, by mixing it with the desired quantity of initiator in a 500-ml or a 1000-ml flask of a rotating "Rotavapor" apparatus from Buchi in a nitrogen atmosphere. After two hours of reacting at 70° C. and a cooling down period of thirty minutes, with $N_2$ being passed over the reaction mixture, 0.1% w/w of Irganox 1010 was added to the modified (co)polymer.

Unless otherwise stated, the melt strength of the polypropylene (co)polymer was determined at 180° C., using a Göttfert Rheotens® and a Göttfert Rheograph® 2001 (speed 0.5 mm/s, acceleration 24 mm/s², sample length 70 mm).

The "MFI" or "melt flow index" of the modified or unmodified polymers was determined in a standard manner using a Göttfert Melt Indexer® model MP-D, in accordance with DIN 53735 and ASTM 1238 (230° C., 21.6 N).

The "die-swell," namely, the degree to which the extrudate swells after it has left the nozzle, was measured on samples made during the MFI measurements by subtracting the nozzle diameter from the average thickness of ten extruded samples. In the evaluation of the modified polymer the die-swell was usually found to be proportional to the melt strength.

The particle size distribution of initiator dispersions was measured with the aid of light diffraction in a well-known manner using a Malvern® Particle Sizer.

EXAMPLES

Comparative Example A

In this Example, 100 g of Moplen FLS20 was modified as specified above, without an initiator being added. The melt strength of the obtained polypropylene was 0.25 N, the MFI was 3.5 g/10 min, and the die-swell was 2.7 mm.

Comparative Example B

The experiment of Comarative Example A was repeated, without the addition of antioxidant. The melt strength of the obtained polypropylene was 0.26 N, the MFI was 3.5 g/10 min, and the die-swell was 2.6 mm.

Comparative Example C

The experiment of Comparative Example A was repeated at a temperature of 140° C. The melt strength, the MFI, and the die-swell of the obtained polypropylene corresponded to those obtained in Example A.

Comparative Examples D–F

In an experiment according to Comparative Example A, an initiator was added to the reactor as well as the polypropylene. In Examples D and E 25% w/w solutions of Trigonox EHP in isododecane and Trigonox 25-C75 in isododecane, respectively, were employed. In Example F a 10% w/w solution of Perkadox 16 in acetone was used. Use was made of 2 mmoles of initiator per 100 g of polypropylene. The melt strengths of the resulting polymers are listed in Table I.

TABLE I

| Exp | Initiator | form of dosing | MFI (g/10 min) | die-swell (mm) | melt strength (N) |
|---|---|---|---|---|---|
| D | Trig. EHP | dilution | 10.7 | 3.2 | 0.73 |
| E | Trig. 25 | dilution | 3.8 | 2.7 | 0.37 |
| F | Perk. 16 | solution | 6.4 | 2.6 | 0.19 |

Comparative Examples G–J

The experiments according to Comparative Examples D-F were repeated. This time no dilution or solution was employed, but use was made of the solid initiator in a formulation of the highest commercially available concentration. The type of initiator used and the results are listed in Table II. The reaction with Laurox in this case was carried out at 95° C., that with Lucidol at 105° C.

TABLE II

| Exp | Initiator | MFI (g/10 min) | die-swell (mm) | melt strength (N) |
|---|---|---|---|---|
| G | Liladox | 8.4 | 2.6 | 0.17 |
| H | Perkadox 16 | 8.2 | 3.2 | 0.47 |
| I | Laurox | 10.9 | 2.0 | 0.01 |
| J | Lucidol-W75 | 7.4 | 3.1 | 0.39 |

Comparative Examples K–P

Comparative Experiment G was repeated, except that this time instead of the pure Liladox coarse dispersions of it were employed. In the dispersions various surface-active materials were evaluated. Listed in the table below are d90 and d99 characteristic of the particle size distribution (the average particle size of 90 and 99% by weight of initiator particles, respectively), as well as the surface-active material employed and the results.

TABLE III

| Exp | surface-active material | d90 ($\mu$m) | d99 ($\mu$m) | MFI (g/10 min) | die-swell (mm) | melt strength (N) |
|---|---|---|---|---|---|---|
| K | Gohsenol KP08 | 46.9 | 79.0 | 6.9 | 2.7 | 0.38 |
| L | Unitika UMR-10 m | 69.7 | 102.1 | 6.8 | 2.4 | 0.26 |
| M | Methocel F50 | 71.5 | 103.5 | 6.1 | 2.5 | 0.27 |
| N | Dapral GE202 | 53.3 | 75.5 | 6.7 | 2.7 | 0.30 |
| O | Dispex N40 | 75.7 | 105.7 | 7.1 | 2.8 | 0.22 |
| P | Gohsenol KP08 and Rhodigel 23 | 66.9 | 102.1 | 7.9 | 2.6 | 0.24 |

Examples 1–3

In an experiment according to Comparative Example A, there was added to the reactor, in addition to the polypropylene, an aqueous emulsion of 40% w/w of bis(2-ethylhexyl) peroxydicarbonate (Trigonox EHP-W40). The quantity of initiator used per 100 g of polypropylene and the characteristics of the resulting polymer are listed in Table IV. At least 99% w/w of the peroxide droplets in the emulsions was smaller than 50 $\mu$m (d99 <50 $\mu$m).

TABLE IV

| Exp | Initiator quantity (meq./100 g) | MFI (g/10 min) | die-swell (mm) | melt strength (N) |
|---|---|---|---|---|
| 1 | 1 | 10.2 | 3.2 | 0.92 |
| 2 | 1.5 | 7.3 | 3.4 | 0.93 |
| 3 | 2 | 9.5 | 3.4 | 0.96 |

Examples 4–6

In an experiment according to Examples 1–3, a Liladox 33W suspension was used instead of the bis(2-ethylhexyl) peroxydicarbonate emulsion. Again, the initiator concentration was varied. The quantity of initiator used and the results are listed in Table V. The d99 of the initiator suspension is smaller than 50 $\mu$m.

TABLE V

| Exp | Initiator quantity (meq./100 g) | MFI (g/10 min) | die-swell (mm) | melt strength (N) |
|---|---|---|---|---|
| 4 | 0.5 | 10.2 | 2.5 | 0.28 |
| 5 | 1.5 | 9.4 | 3.1 | 0.54 |
| 6 | 2 | 10.8 | 2.8 | 0.59 |

Examples 7–9

Example 6 was repeated, except that this time the 2 meq. of initiator per 100 g of polypropylene were added in various dilutions. The d99 of the suspensions is smaller than 50 $\mu$m. The concentration of the dilution used and the results are listed in Table VI.

TABLE VI

| Exp | initiator concentration (% w/w) | MFI (g/10 min) | die-swell (mm) | melt strength (N) |
|---|---|---|---|---|
| 7 | 33 | 16.6 | 3.1 | 0.65 |
| 8 | 10 | 12.2 | 3.1 | 0.72 |
| 9 | 5 | 9.3 | 3.0 | 0.73 |

Examples 10–15

Surface-active materials were evaluated in experiments 10–15. To this end, the process according to experiment 6 was employed, with a number of products representative of the different classes of surface-active materials being incorporated into the Liladox suspension having an initiator concentration in the range of 5 to 33% w/w. The dispersions have a particle size distribution characterised by d90<50 $\mu$m and d99<65 $\mu$m. The dispersions were obtained by sieving the dispersions obtained with an UltraTurrax. The materials employed and the results are listed in Table VII.

TABLE VII

| Exp | surface-active material | d90 ($\mu$m) | d99 ($\mu$m) | MFI (g/10 min) | die-swell (mm) | melt strength (N) |
|---|---|---|---|---|---|---|
| 10 | Gohsenol KP08 | 16.3 | 42.1 | 12.0 | 2.8 | 0.74 |
| 11 | Unitika UMR-10 m | 29.9 | 54.7 | 11.0 | 2.8 | 0.67 |
| 12 | Methocel F50 | 15.7 | 36.4 | 15.0 | 2.7 | 0.67 |
| 13 | Dapral GE202 | 27.0 | 48.5 | 9.0 | 2.7 | 0.62 |
| 14 | Dispex N40 | 42.5 | 51.3 | 12.0 | 2.9 | 0.61 |
| 15 | Gohsenol KP08 and Rhodigel 23 | 22.7 | 41.6 | 8.6 | 2.9 | 0.45 |

Examples 16–24

Experiment 6 was repeated, except that instead of a Liladox suspension various other aqueous initiator formulations were evaluated, all of which had a particle size distribution with d99<50 μm. The initiator formulation employed, the temperature at which the modification took place, and the results obtained are listed in the table below.

TABLE VIII

| Exp | initiator | Temp. (° C.) | MFI (g/10 min) | die-swell (mm) | melt strength (N) |
|---|---|---|---|---|---|
| 16 | Perkadox 16-W40 | 70 | 8.7 | 2.5 | 0.66 |
| 17 | Laurox-W40-GD4 | 95 | 5.5 | 2.4 | 0.41 |
| 18 | Lucidol-W40 | 105 | 5.7 | 3.5 | 0.67 |
| 19 | Laurox-W40-GD1 | 95 | 5.5 | 2.4 | 0.41 |
| 20 | Trigonox 23-W50 | 80 | 3.5 | 2.6 | 0.42 |
| 21 | Trigonox 99-W40 | 70 | 4.1 | 2.6 | 0.36 |
| 22 | Trigonox 151-W50 | 70 | 6.6 | 2.7 | 0.36 |
| 23 | Trigonox EHP-W40 | 70 | 8.8 | 3.6 | 1.02 |
| 24 | Trigonox 25-W33 | 70 | 3.1 | 2.7 | 0.43 |

Comparative Example Q and Examples 25–28

In a process according to Comparative Example A, a polar medium was added to the flask in addition to 100 g of polypropylene (Moplen FLS20) in Example Q to obtain a slurry or suspension of the polymer. After the reaction at 70° C. antioxidant was added and the modified polymer was dried in a vacuum oven at 50° C. for eighteen hours. This experiment was repeated with initiator dispersions with d90<50 μm and d99<65 μm being used in a quantity of 2 meq/100 g of polymer. Notes regarding the medium used and the properties of the resulting polymer are listed in Table IX.

TABLE IX

| Exp | Initiator | Note | MFI (g/10 min) | die-swell (mm) | melt strength (N) |
|---|---|---|---|---|---|
| 25 | Perkadox 16-W40 | 1 | 9.9 | 3.5 | 0.60 |
| 26 | Liladox 33W | 1 | 6.2 | 2.8 | 0.35 |
| 27 | Liladox 33W | 2 | 3.6 | 3.8 | 0.43 |
| 28 | Liladox 33W | 3 | 10.2 | 2.7 | 0.46 |
| Q | None | 4 | 4.3 | 2.5 | 0.27 |

Notes:
1 = medium was 100 g of water
2 = medium was 200 g of water and 5 g of $CaCl_2$
3 = medium was 100 g of water and 100 g of acetone
4 = medium was 200 g of water

Example 29 and Comparative Example R

Two parts by weight of Liladox-33W suspension, with d99 smaller than 50 μm, were incorporated into one part by weight of silica by briefly mixing the components in a mixing drum at room temperature.

The solid peroxide formulation thus obtained was mixed in the same way with the polymer to be modified (HC00A1-B1), in a quantity of 1 mmole of peroxide per 100 g of polymer and 0.1% w/w of Irganox 1010. This mixture was stored for further use in sealed drums for at least sixteen hours.

In a Haake® Rheocord System equipped with Rheomex® TW100 screws, which provide intensive mixing, the latter mixture was mixed and heated under the following conditions:

| | |
|---|---|
| temperature profile | 170/180/180/190° C. |
| screw speed | 80 rotations/minute. |

During the experiment nitrogen was passed through the mixture in the feed funnel. The resulting modified polymer was cooled in a water bath and then granulated. The same procedure was adopted in comparative example R, except that no peroxide was used. The results are listed in the Table below. The melt strength was determined at 200° C.

TABLE X

| Exp | Initiator quantity (meq./100 g) | MFI (g/10 min) | die-swell (mm) | melt strength (N) |
|---|---|---|---|---|
| 29 | 1 | 1.8 | 4.8 | 0.22 |
| R | 0 | 2.6 | 2.6 | 0.12 |

Comparative Example S

Also analysed was Profax PF814, a commercially available polypropylene with improved melt strength probably obtained by subjecting polypropylene to electron irradiation treatment (see Modern Plastics Int., July 1995, p. 18), to give the following results.

| | |
|---|---|
| MFI | 4.1 g/10 min. |
| Die swell | 5.4 mm |
| Melt strength | 0.18 N (measured at 180° C.) |
| | 0.11 N (measured at 200° C.). |

What is claimed is:

1. A process for enhancing the melt strength of a polypropylene (co)polymer by mixing an initiator with the polypropylene (co)polymer at a temperature below the decomposition temperature and heating the mixture, with most of the initiator decomposing before the polymer has melted and with the formed radicals reacting with the polymer, wherein the polypropylene (co)polymer is contacted with a dispersion of the initiator in a polar medium, with at least 90% by weight of the initiator particles being smaller than 50 μm and at least 99% by weight of the initiator particles being smaller than 65 μm.

2. A process according to claim 1 wherein at least 99% by weight of the initiator particles is smaller than 50 μm.

3. A process according to claim 1 wherein the initiator is dispersed in water.

4. A process according to claim 1 wherein the initiator has a half life of one hour or less at a temperature of 100° C.

5. A process according to claim 4 wherein the initiator is a peroxydicarbonate.

6. A process according to claim 5 wherein the peroxydicarbonate is a solid compound at room temperature.

7. A process according to claim 5 wherein the peroxydicarbonate is bis(2-ethylhexyl)peroxydicarbonate.

8. A process according to claim 1 wherein the polar medium comprises a freezing point depression agent.

9. A process according to claim 8 wherein the freezing point depression agent is mainly made up of methanol, ethanol, propanol, ethylene glycol, propane-1,2-diol, or a mixture of two or more of these compounds.

10. A process according to claim 1 wherein the polar medium in which the initiator is dispersed comprises at least one surface active material.

11. A process according to claim 10 wherein one or more of the surface-active materials are anionic or non-ionic.

12. A process according to claim 1 wherein the polar medium in which the initiator is dispersed contains at least one thickener.

13. A process according to claim 1 wherein the initiator concentration in the polar medium is less than 33% by weight.

14. A process according to claim 1 wherein the initiator dispersion is incorporated into a carrier material.

15. A process according to claim 1 wherein the polypropylene (co)polymer has a melt flow index (MFI) in the range of 0.5 to 50 g/10 min (2.16 kg, 230° C.).

16. A process according to claim 1 wherein use is made of 0.05 to 5 mmoles of initiator per 100 g of polypropylene (co)polymer.

17. A process according to claim 1 wherein during the decomposition of the initiator oxygen-free conditions are maintained.

18. A process according to claim 1 wherein the modification of the polypropylene (co)polymer is carried out in an extruder.

19. A process according claim 1 wherein a stabilizer is added to the obtained modified polypropylene in order to render harmless any free radicals still present as well as any radicals which may be formed later from as yet unreacted initiator.

20. A process according to claim 1 wherein the modification of the propylene (co)polymer is carried out in an apparatus which is used to make foamed materials.

* * * * *